US010971144B2

(12) United States Patent
Mahajan

(10) Patent No.: US 10,971,144 B2
(45) Date of Patent: Apr. 6, 2021

(54) COMMUNICATING CONTEXT TO A DEVICE USING AN IMPERCEPTIBLE AUDIO IDENTIFIER

(71) Applicant: Amazon Technologies, Inc., Reno, NV (US)

(72) Inventor: Satayan Mahajan, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/123,869

(22) Filed: Sep. 6, 2018

(65) Prior Publication Data

US 2020/0082816 A1 Mar. 12, 2020

(51) Int. Cl.
| | | |
|---|---|---|
| *G10L 15/22* | (2006.01) | |
| *G10L 15/30* | (2013.01) | |
| *G10L 25/51* | (2013.01) | |
| *G06F 16/78* | (2019.01) | |
| *G06F 16/783* | (2019.01) | |
| *H04L 29/08* | (2006.01) | |

(52) U.S. Cl.
CPC .......... *G10L 15/22* (2013.01); *G06F 16/7834* (2019.01); *G06F 16/7867* (2019.01); *G10L 15/30* (2013.01); *G10L 25/51* (2013.01); *G10L 2015/223* (2013.01); *H04L 67/10* (2013.01)

(58) Field of Classification Search
CPC ......... G10L 15/22; G10L 25/51; G10L 15/30; G10L 2015/223; G06F 16/7867; G06F 16/7834; H04L 67/10
USPC ........................................................ 704/275
See application file for complete search history.

(56) References Cited

U.S. PATENT DOCUMENTS

| | | | | |
|---|---|---|---|---|
| 2013/0204415 A1* | 8/2013 | Fregley | .............. | H04N 21/8358 700/94 |
| 2015/0302458 A1* | 10/2015 | Dides | ................. | G06Q 30/0241 705/14.41 |
| 2016/0140965 A1* | 5/2016 | Kumar | ................. | H04N 21/233 704/9 |

(Continued)

OTHER PUBLICATIONS

International Search Report and Written Opinion issued in co-related International Application No. PCT/US2019/049785 dated Jan. 9, 2020.

*Primary Examiner* — Edwin S Leland, III
(74) *Attorney, Agent, or Firm* — Hogan Lovells US LLP

(57) ABSTRACT

Various embodiments of systems and methods allow a system to embed an item identifier into a content item. A first device can then play an audio trigger that is imperceptible to humans before playing the item identifier. A second device can go into an active listening mode after detecting the audio trigger and record an audio segment contain the embedded item identifier. A system can then decode the item identifier to determine an appropriate context for the second device. The second device can then receive a vocal command or query and respond according to the determined context. In one example, the first device can be a television, and the second device can be a digital assistant (e.g., Amazon Alexa) that detects advertisements played on the television via audio signals embedded in accompanying audio streams. Subsequent user interactions with the digital assistant can then be informed by the context of the recently-heard advertisements.

20 Claims, 9 Drawing Sheets

(56) References Cited

U.S. PATENT DOCUMENTS

| | | | |
|---|---|---|---|
| 2016/0287987 A1* | 10/2016 | Onda | A63F 13/86 |
| 2017/0068423 A1* | 3/2017 | Napolitano | G06F 3/0482 |
| 2017/0213552 A1* | 7/2017 | Gupta | G10L 15/22 |
| 2018/0035174 A1* | 2/2018 | Littlejohn | H04N 21/4334 |
| 2018/0124472 A1* | 5/2018 | Staff | H04N 21/4126 |
| 2018/0232371 A1* | 8/2018 | Lee | G06F 16/48 |
| 2018/0293603 A1* | 10/2018 | Glazier | G06Q 30/0214 |
| 2018/0332389 A1* | 11/2018 | Ekkizogloy | G10L 15/26 |
| 2018/0343481 A1* | 11/2018 | Loheide | H04N 21/2393 |
| 2019/0236207 A1* | 8/2019 | Lee | G06F 16/24578 |
| 2019/0236208 A1* | 8/2019 | Lee | G06F 16/683 |
| 2019/0265831 A1* | 8/2019 | Sinnott | G06K 9/00013 |
| 2019/0295540 A1* | 9/2019 | Grima | G10L 15/22 |
| 2019/0355359 A1* | 11/2019 | Bhaya | G06F 3/162 |
| 2020/0082816 A1* | 3/2020 | Mahajan | G10L 15/30 |

\* cited by examiner

COMMUNICATING CONTEXT TO A DEVICE USING AN IMPERCEPTIBLE AUDIO IDENTIFIER

BACKGROUND

With the proliferation of multimedia distribution systems, people are increasingly turning to on-demand entertainment that they access through diverse devices and networks. While this proliferation enables users to access their favorite content in ways that fit their preferences, this diversity inhibits the ability for systems to create a cohesive and integrated experience when users switch between systems. For example, if a person begins an experience on a television and wishes to migrate to a cell phone, the switch between devices will likely result in a disjointed experience. While certain systems have attempted to generate a seamless experience between devices, these systems generally rely on the devices being associated with a same manufacturer, account profile, service, etc.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to provide a contextually relevant experience across multiple devices. In some embodiments, a media content item can include an embedded item identifier. The device that plays the media content item can play an imperceptible audio trigger such as an ultrasonic wake word to activate a second device such as a smart speaker. The second device can then record an audio segment that includes the item identifier. After analyzing the audio segment and decoding the item identifier, the second device and associated systems can be informed of the correct context. User engagement with the second device can then be contextually aware based on the item identifier. For example, if a user engages the second device, responses to the engagement can be informed by the item identifier. This enables a seamless experience between devices even though there might not be a direct connection or shared system between the two devices.

Various other functions and advantages are described and suggested below as may be provided in accordance with the various embodiments.

Figure 1:
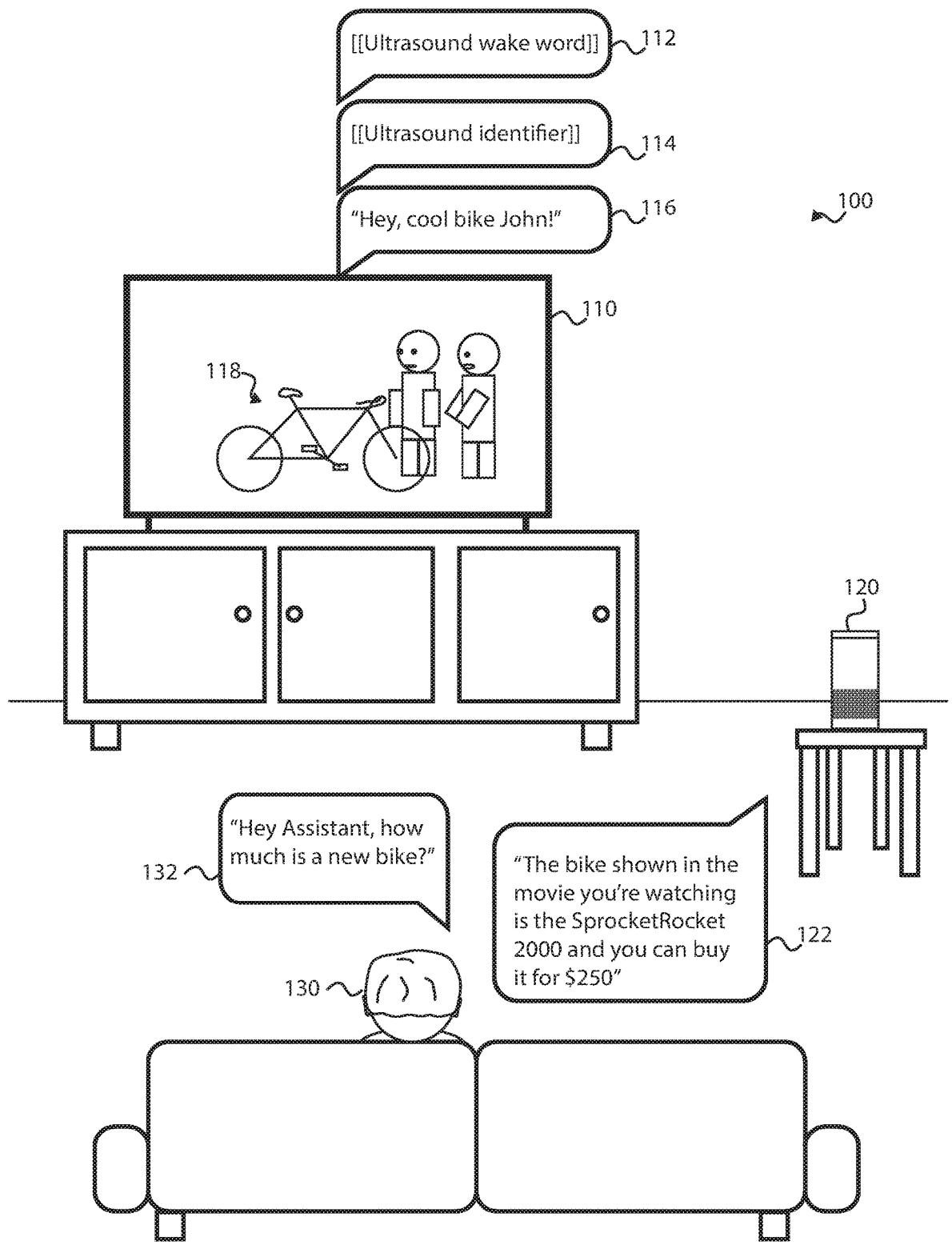
FIG. 1 illustrates an example environment demonstrating communication between a television, a virtual assistant, and a user.

FIG. 1 illustrates an example environment 100 demonstrating a television 110, a virtual assistant 120, and a user 130 intercommunicating. A user 130 can watch content on his television 110. The content can be interactive and/or passive with examples including videogames, movies, videoconferencing, etc. The television 110 can stream digital content on demand, it can play broadcast content, it can play physical media (e.g., DVDs), etc. The content can be "analog" instead of digital; for example, the content can be content broadcast using amplitude modulation, frequency modulation, NTSC, or PAL standards. The content can include videogame content, augmented reality content, virtual reality content, video-conferencing content, etc. It should be understood that a television 110 is one of many possible example devices and other devices are contemplated such as a radio, smart speaker, phone, tablet, laptop, etc. The television 110 can receive the content from a content delivery service. In some embodiments, a separate device interfaces with the content delivery service and then provides a video signal to the television 110. In example environment 100, the television 110 is displaying a movie that currently features a bicycle 118 on screen. While a bicycle 118 is show, other products, objects, or things of interest can be presented and/or referenced by the content on the television 110.

When the bicycle 118 is first shown on the television 110, the television can emit an ultrasonic wake word 112. For example, a "digital assistant" 120 (e.g., a physical device that serves as an interface for a digital assistant) can be programmed to detect one or more wake words. The Amazon Echo smart speaker is an example of such a physical device. The Amazon Echo serves as an interface for Amazon Alexa which is an example digital assistant. When it detects a wake word, it can engage an active listening mode to record subsequent audio samples. The subsequent audio samples can be ultrasonic. For example, the digital assistant can receive an ultrasonic signal that includes the ultrasonic wake word and a subsequent product identifier. A bandpass filter can be used to isolate the ultrasonic frequencies. In example environment 100, the digital assistant can begin recording the next audio content from the television, the ultrasonic identifier 114. The ultrasonic identifier 114 can be an identifier for the bicycle 118 that can inform the digital assistant 120 what is currently being presented on the television 110.

It should be understood that the ultrasonic wake word 112 and/or the ultrasonic identifier 114 can be within a human's normal hearing range. For example, the wake word can be audible and can serve to advise the user 130 that the television 110 is communicating to the digital assistant 120. The wake word and/or identifier can be played in the range of human hearing but can be hidden as a "fingerprint" within the normal audio stream. For example, the movie audio 116 of "Hey, cool bike John!" can be modulated or transformed in such a way that it encodes the identifier without degrading the audio experience for the user 130. The term "ultrasonic" can generally be taken to mean "of a frequency and/or loudness that is humanly imperceptible" as appropriate. Similarly, the term "imperceptible" can mean a sound that is a frequency and/or volume that outside of human hearing or is otherwise unintelligible by humans (such as a fingerprint comprising slight modifications to an audio signal).

The user 130 might be interested in what is on the screen but traditional approaches might require the user 130 to do more investigation and research than the user 130 is willing to do. For example, the user 130 might have to do an Internet search for "what bicycle is in movie?" and then find that bicycle on a marketplace to determine how much it costs. The user 130 might ask the digital assistant 120 some questions as part of his research. Without the context clues of what is playing on the television 110 the digital assistant 120 might not give the best and most relevant responses.

In example environment 100, the digital assistant now has context (e.g., it "knows" that the bicycle 118 was just presented on screen) for future prompts and/or commands. When the user 130 asks "Hey Assistant, how much is a new bike?" 132, the digital assistant 120 can determine that the user 130 is likely referring to the bicycle 118 on the television 110 or one similar. Without this context, the digital assistant 120 might instead determine incorrectly that the user is inquiring about a motorcycle or a children's bicycle.

The digital assistant 120 can then provide a contextually relevant response 112 such as "the bike shown in the movie you're watching is the SprocketRocket 2000 and you can buy it for $250." It should be understood that a specific reference to the item (e.g., bicycle 118) might not be optimal, but rather can merely provide context for the contextually relevant response. For example, instead of response 112 in environment 100, the response could have been "Bikes usually cost between $200 and $500." Or a reference to the item can be less direct, such as "bikes like the one in the movie you are watching cost around $250."

It should be understood that the devices, items, and communications shown in example environment 100 are merely examples and that other devices, items, and communications are contemplated, as will be discussed herein. Having a primary engagement device that can communicate through imperceptible sounds to a secondary engagement device when those devices cannot otherwise communicate can help provide a unified experience for the user as the user moves from engaging one device to engaging another device.

Other examples can highlight certain benefits to this technology. For example, if the television were presenting dog food, this might remind the viewer that the viewer needs to purchase dog food. If the viewer then inquires about dog food, the digital assistant can respond with an option to purchase the dog food brand shown on the television and/or the dog food brand that the viewer last purchased. Thus, these techniques can assist discovery of new products or items as well as facilitate reminders for familiar products or items.

In some embodiments, the user's spoken word might be difficult to understand because of environmental noise. For example, the digital assistant might just detect fragments of what is spoken such as "what is the price [undecipherable noise] food?" The digital assistant can then, using context that the user just viewed a commercial for dog food, determine that "food" refers to "dog food" and can assume the user refers to the dog food recently presented.

Figure 2:
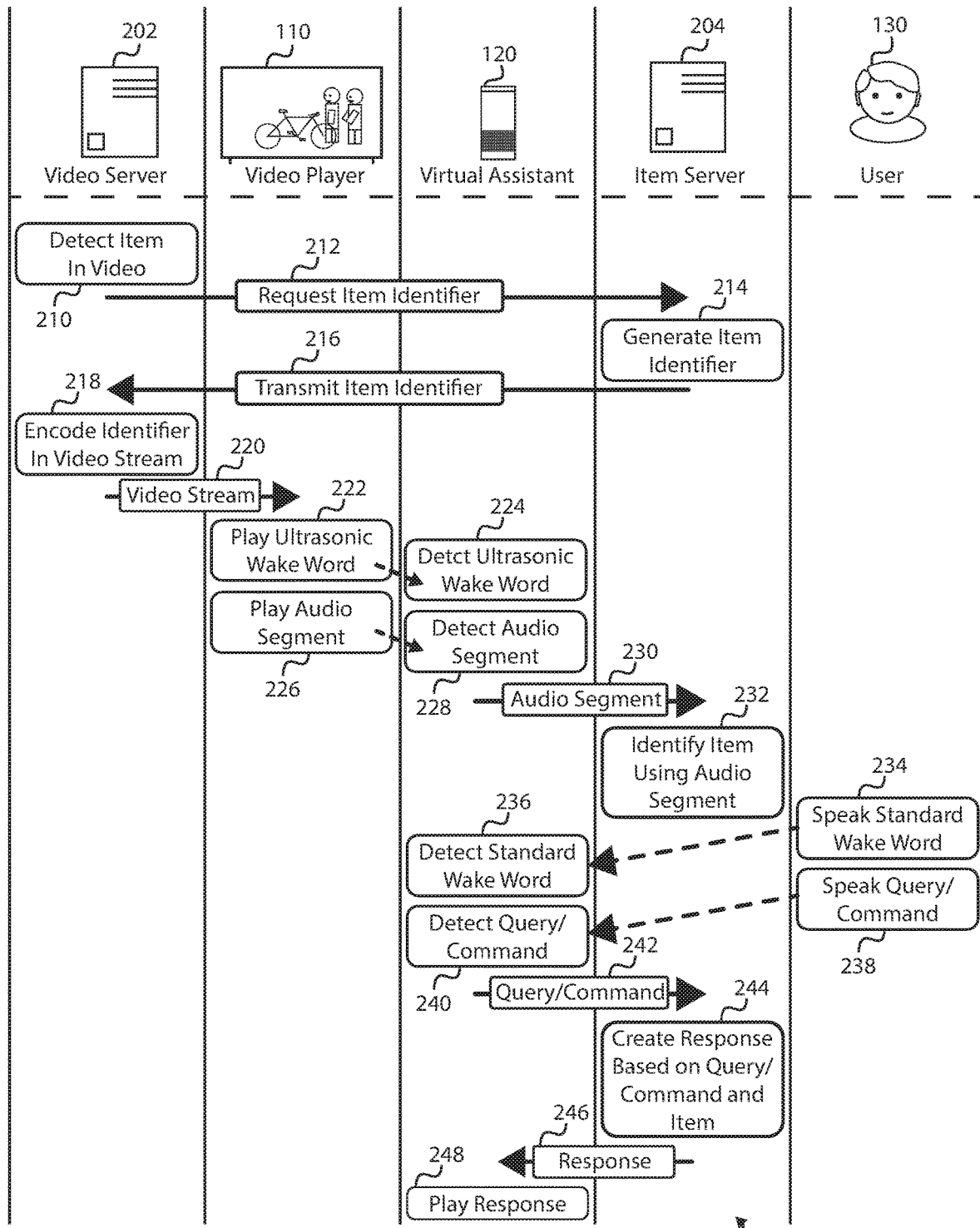
FIG. 2 illustrates an example "swim lane" diagram according to various embodiments.

FIG. 2 illustrates an example "swim lane" diagram 200 according to various embodiments. Diagram 200 shows an example technique for how various devices and entities can intercommunicate. For example, a video server 202, video player 110 (e.g., a television), virtual assistant 120, item server 204, and user 130 can all intercommunicate in various manners. It should be understood that entities represented in FIG. 2 such as video server 202 and video player 110 can be systems that include one or more devices in communication.

A video server 202 can be a video content creator, distributor, broadcaster, etc. For example, if the video server 202 is associated with a movie, the video server 202 can be the entity that filmed and edited the movie. The video server 202 can be the entity that created DVDs of the movie and/or mastered the movie for distribution on various channels. Video server 202 can be a streaming service that provides videos on demand. Video server 202 can be a broadcaster that broadcasts the movie over public airwaves. It should be understood that producing videos is but one example and other media or experiences are contemplated such as audio, interactive content (e.g., web sites, videogames, and virtual/augmented reality systems), messaging systems, etc.

The video server 202 can detect an item in a video 210. The video server can be separate from the item server 204 or can be integrated within the item server 204. The video server 202 can receive a video and detect the item in the video by using image recognition, reading metadata, or other means. For example, an operator can manually identify an item. The item can be in the video as paid promotional activity such as a product placement or traditional advertisement. In some embodiments, an algorithm such as a machine learning algorithm can automatically detect the item in the video. Such an algorithm can compare the item with a database of item images, names, and specifications to determine whether the item is in the video. In some embodiments, audio can be used to assist in identifying the item. For example, a character in a video might directly reference the name of the item.

An item can be digital such as digital media (e.g., a movie, television show, or song), computer software, a web site, videogame, videogame content, etc. An item can be a physical item such as something that can be purchased at a brick-and-mortar store or shipped to a person's home.

In some embodiments, the system can determine a prominence of the item to determine whether or not the item is featured in the video. This can be determined based on the size of the item, the location of the item in the video frame (e.g., whether or not it is centered), the illumination of the item (e.g., dark items might be more background items), whether a character interacts with the item, the visual saliency of the item (e.g., is it blurry or of low contrast), whether the item "makes noise" (e.g., a car having an audible engine roar), a recurrence factor (e.g., how many times the item appears on screen), a duration that the item is on screen, etc. In some embodiments, detection of the item can be crowd-sourced such that users identify the item.

The video server 202 can then request an item identifier 212 from the item server 204. For example, the video server 202 (or the entity controlling the video server 202) can specify a specific item on a marketplace associated with the item server 204. For example, the video server 202 can request an item identifier using a Uniform Resource Locator (URL) associated with the item. It should be understood that the item identifier is not always necessary. For example, after detecting the item, the video server 202 can, without assistance from the item server 204, determine an appropriate item identifier. The item server 204 can be a system whereby users can obtain items. Obtaining items can include downloading, renting, purchasing, leasing, subscribing, etc. The item server can facilitate a marketplace.

In some embodiments, the request 212 can identify the source of the item such as the name of a movie and a timestamp of where the item was featured. This can assist the item server 204 in making a determination as to whether to provide an identifier based on the content of the video. For example, if a child's toy is featured in a mature film, it might be undesirable to identify the item because the item creator might not want people to relate the item with the film. The item server can respond to the request based on details of the request in other ways. For example, an item promotion can be established that is based on a characteristic of the video such as a director, an appropriateness rating, a typical viewer demographic, etc.

The item server 204 can generate an item identifier 214. In some embodiments, the item identifier 214 is a unique code that is assigned to the item. The item identifier can be associated with the specific request, thus contemplating that an item can be associated with multiple item identifiers. In some embodiments, the item server 204 cryptographically signs the item identifier to validate that the identifier came from the item server 204. This can help prevent unauthorized generation of item identifiers and can ensure that only meaningful item identifiers are utilized in the system (e.g., ones that actual refer to items stored with item server 204).

In some embodiments, a separate service can generate item identifiers. For example, a universal item identifier service can be tasked with maintaining a database of identifiers and what entities or items are associated with those identifiers. In some embodiments, an entity such as product manufacturer can reserve an item identifier which the product manufacturer can then utilize as desired.

In some embodiments, the item identifier is a URL for the item. The item identifier might have a restriction to its size. For example, it can be restricted to a certain number of bytes. The item identifier can include extra information about the item. For example, the item identifier can also indicate an availability of the item (e.g., in stock, sold out, or a quantity remaining), a price of the item, a review score and/or count of the item, alternate configurations of the item, shipping options for the item (e.g., is two-day shipping available), information about the seller of the item, a targeted demographic (e.g., a minimum age requirement for the content item), etc. In some embodiments, the item server 204 can indicate a promotion associated with the item with the item identifier. For example, the item server 204 can indicate that the typical price of an item is $10, but for those who buy the item after seeing the video can purchase it for $7.

The item server 204 can transmit the item identifier 216 to the video server 202. It should be understood that the request 212, generating the item identifier 214, and the transmission of the identifier 216 can be optimized for speed so that it can determine item identifiers for live video streams without an undue delay.

In some embodiments, the video server 202 can generate an identifier without communicating with item server 204. In some embodiments, the item server can generate the identifier manually.

The video server 202 can encode the identifier into the video stream 218. For example, the identifier (and related information if it exists) can be added to the video stream. The identifier can be added as metadata for the stream or can be "baked in" to the stream content. Being baked in can mean that the identifier is converted to an audio signal that is then applied to an audio track of the video stream. Encoding the identifier into the video stream can be useful because it would not require support from the video player 110 to encode the item identifier into the video stream or otherwise present the identifier.

If the video stream is pre-recorded there can be advantages to encoding the identifier into the video stream once when the video stream is acquired to preserve computational resources when the video stream is requested. In this way, the video server 202 need only encode the identifier a single time instead of each time the video is played or requested. In some embodiments, the item identifier can get stale and should be refreshed by the video server 202. For example, the video server 202 can request a new item identifier every day and each time the video stream is requested, the current item identifier can be encoded into the video stream. In some embodiments, a unique item identifier is provided for each video stream requested.

The video server 202 can send the video stream 220 to the video player 110. For example, the video stream can be broadcast over the airwaves and/or through cable television. The video server 202 can send the video stream via the Internet e.g., as an on-demand video. The video server 202 can send the video stream on physical media such as DVD or similar.

The video player 110 can be a television, tablet, phone, laptop, etc. In some embodiments, various features of the illustrated video player 110 can be performed by separate devices. For example, a cable box can receive a variety of cable channels containing video data, select a specific channel, and decode the video data into a format that is easier for a television to display. Other devices are contemplated such as streaming devices that have "apps" for playing video content from a certain streaming service on demand.

The video player 110 can play the ultrasonic wake word 222. For example, the ultrasonic wake word can be incorporated into an audio track of the video stream and when the video player 110 plays that portion of the audio track, and then the wake word is consequently played. This means that the video server 202, when encoding the identifier into the video stream can also encode the wake word before the identifier. In some embodiments, the video player 110 receives the item identifier with the video stream (e.g., as metadata) and generates the wake word audio itself. It should be understood that the term "wake word" does not necessarily mean that the wake word is an expression in a human language. The wake word can be a predetermined signal such as a tone or series of tones.

The wake word can be audible (i.e., capable of being heard by most humans) or inaudible (i.e., most humans cannot hear it). In some embodiments, the wake word can indicate to the user that the wake word is being transmitted. This can advise a user that the user can engage in another device in a contextually relevant way because the first device is about to communicate the context to the other device. In some embodiments, the wake word can be dynamic to prevent misuse. For example, the wake word can be determined algorithmically based on the current time.

The virtual assistant 120 can detect the ultrasonic wake word 224. As stated elsewhere, the user of the term "virtual assistant" can include a device used as an interface to a virtual assistant. The "virtual assistant" can be a system that provides intelligent interactivity to a user through voice or other natural communication. Certain operations of the virtual assistant can be performed locally, such as on a smart speaker, a cellular phone, a tablet, laptop, etc. while other operations can be performed on a remote server (e.g., processing data and generating responses).

A "wake word" can be a word or other audio signal that can be used to "wake" a computing device from a low-power state. A wake word can trigger the device to record subsequent audio. Wake words such as "ok Google," "hey Siri," "Alexa," and "Computer" can be programmed to a device such that the device is placed in a low power mode but is constantly recording audio from microphones until the wake word is detected. In some embodiments, a system only permits a limited number of wake words in order to keep the computation and power requirements to a minimum. A system can be programmed to have two wake words, a first for human interaction which can be a word that someone might say while a second wake word can be for computer interaction and need not be a word in any human language. In some embodiments, the wake word described in items 222 and 224 can be the same wake word as that described later; that is, the device can be programmed with a single wake word. After the wake word is detected, the virtual assistant can begin recording audio.

In some embodiments, when the virtual assistant detects the wake word, it can also detect the item identifier. For example the digital assistant can recognize an ultrasonic signal and that ultrasonic signal can include the wake word and any product identifiers. The digital assistant can include an ultrasonic bandpass filter to isolate ultrasonic frequencies.

In some embodiments, when the virtual assistant detects the wake word, it can go into an active mode and listen to a wide range of frequencies. For example, the wake word can be ultrasonic but the subsequent audio segment can also include frequencies within the range of human hearing.

In some embodiments, a wake word is not used. For example, a digital assistant can be constantly listening for identifiers (ultrasonic and/or human detectible). For example, the assistant can be in an active mode without first detecting a wake word. In some embodiments, the virtual assistant can have a physical or virtual switch to engage and disengage the active mode.

Regardless of the technique used, procedures can be taken to advise the user that audio is being detected. Further, audio can be detected, recorded, and transmitted in such a way that the user's voice is not detected or recorded without authorization.

The video player 110 can then play an audio segment 226 of the video stream. In some embodiments, the audio segment 226 can be outside of human hearing so that it does not interfere with the user experience. In some embodiments, the audio segment is a standard, unaltered audio segment from a movie without any special encoding. The system can then analyze the segment and determine a timecode of a video that the segment comes from and then determine a product presented at that timecode. The audio segment can include the item identifier.

The virtual assistant 120 can detect the audio segment 226. Subsequent to detecting the ultrasonic wake word, the virtual assistant 120 can only record audio of a certain range of frequencies that are associated with encoded identifiers. For example, had the virtual assistant 120 detected the standard wake word, it would record a wide range of audio (e.g., 20 Hz to 20,000 Hz) whereas when the virtual assistant detects the ultrasonic wake word, it can record just 20,000 Hz to 20,500 Hz which is outside of most people's ability to hear but still within the typical 41,000 sampling rate of most audio systems.

In some embodiments, the identifier is encoded as a fingerprint into the audio segment. The changes to the waveform may be too slight for a person to detect but can be decoded by a computing system.

The virtual assistant 120 can send the audio segment 230 to the item server 204. In some embodiments, the raw audio data is sent to the item server 204 with limited preprocessing (e.g., it can be an unprocessed audio recording). This can permit the item server 204 to use greater resources to detect the encoded identifier in the audio segment. The virtual assistant 120 can send the audio segment to the item server 204 using the Internet or some other communication means.

The item server 204 can identify the item using the audio segment 232. The item server 204 can decode the identifier from the audio segment. After decoding the identifier, the item server 204 can consult a database that matches the item identifier with the item. In some embodiments, the item server 204 is able to update a log for the item and/or the item identifier. For example, the virtual assistant 120 can send the audio segment with information about the virtual assistant. The item server 204 can associate the audio segment with a profile associated with the virtual assistant 120. For example, the item server 204 can determine that a user of a certain age watched a commercial. Precautions can be taken to ensure that private or sensitive data is not mishandled or otherwise treated in a way that is against the user's wishes. For example, the user can "opt in" to this type of data analysis.

In some embodiments, the edge device that serves as an interface for the digital assistant (e.g., a smart speaker) can include a database matching identifiers with items. Thus, the edge device can determine items without needing to consult with the item server 204.

It should be understood that the audio segment can describe multiple items via multiple item identifiers. For example, the audio segment can contain data that describes every item on screen at the time the audio segment is recorded. This can be especially useful when the "item" includes actors, locations, music, etc. that the user may be interested in. The user could then inquire "where is that?" and the virtual assistant can respond accordingly.

In some embodiments, the item server 204 can associate the item with a profile for the associated user. This can help inform later experiences. For example, when the user then searches for an item, the item that was presented in the commercial can be highlighted.

The user 130 can then speak a standard wake word 234. As discussed elsewhere, the standard wake word can be a spoken word or phrase that "wakes" the virtual assistant 120 and activates the virtual assistant to begin recording audio. This can occur immediately after the ultrasonic wake word is played, after the audio segment is played, or at a later time (e.g., a few minutes, an hour, a day, etc.). The virtual assistant 120 can detect the standard wake word 236. The virtual assistant 120 can then begin to record audio to receive a query or command.

The user 130 can then speak a query or command 238. For example, the user can specifically refer to the item. An example might be "what brand of bike is that?" The user can inquire about something that is contextually relevant to the item, such as "add chocolate chips to my grocery list" after seeing an advertisement for a specific brand of chocolate; the virtual assistant can then ask if the user wishes to add that specific brand to the user's list and/or select from previously ordered favorites. The virtual assistant 120 can detect the query or command 240.

The virtual assistant 120 can send the query or command 242 to the item server 204. For example, the virtual assistant 120 can send the raw audio to the item server 204 for language processing on the item server 204. In some embodiments, the virtual assistant 120 withholds the audio segment that from step 228 until a query or command is issued. This can help minimize the amount of data sent to the item server 204 and the amount of data being processed. Withholding the audio segment until needed can also help maintain the user's privacy.

The item server 204 can then create a response based on the query or command and the item 244. For example, if query references a type of product, then the response can identify the specific product of that type that was detected previously. For example, the response can be "are you interested in the brand you heard about just now?" In some embodiments, any item that the user has ever viewed (that is, any item that has been identified using an audio segment regardless of when the user watched the associated video) can be incorporated into the response. This would assume that the items were placed or advertised towards the user because the items are likely relevant to the user. For example, if a user is watching a travel show, then the advertisements would likely be about travel deals or travel equipment. The system can assume that these items are likely of interest to the user. The system can determine that these items are of greater relevance if the user inquires about them.

The item server 204 can send a response 246 to the virtual assistant 120. The response can be an audio stream for the virtual assistant to play. Alternatively, the response can be a text string that can be converted to speech by the virtual assistant (i.e., at the edge device such as a smart speaker). The virtual assistant can then play the response 248. It should be understood that the virtual assistant could present a response in a variety of ways. For example, the response can be an interactive videogame or a web site.

Figure 3:
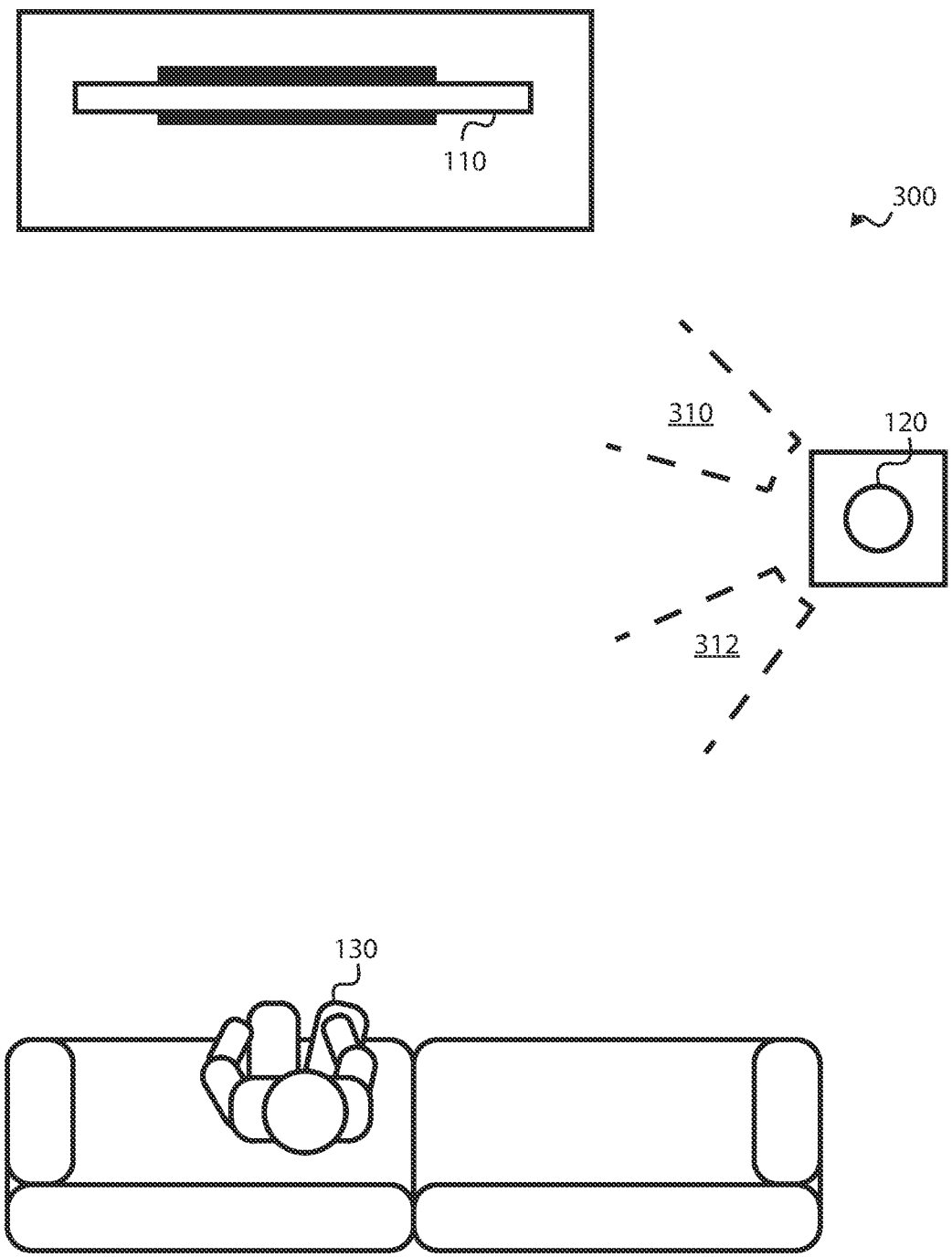
FIG. 3 illustrates an example environment demonstrating privacy features according to various embodiments.

FIG. 3 illustrates an example environment 300 demonstrating privacy features according to various embodiments. When the virtual assistant 120 detects an ultrasonic wake word from the television 110 it can direct its microphone(s) to the television 110 (e.g., isolate an audio signal from the television) so that only audio from the television is recorded. For example, audio within direction 310 pointing towards the televisions 110 can be recorded while audio from the user 130 in direction 312 can be blocked or discarded.

In some embodiments, the virtual assistant 120 can have an array of microphones around its perimeter. It can then select the audio that is coming from a microphone or microphones pointed at the televisions 110. Alternatively or additionally, the virtual assistant 120 can use the multipath nature of audio reflections and propagation delay to isolate the audio segment that has the same multipath characteristics as the watch word. For example, if the virtual assistant 120 has two microphones and it receives the wake word at microphone one and then at microphone two 15 milliseconds later it can only record audio that follows that same pattern, arriving at microphone two 15 milliseconds after microphone one. Similarly, if the wake word arrives a microphone and then arrives at the same microphone after a short delay (i.e., an echo caused by reflections), then the virtual assistant 120 can detect audio segment with the same delay while discarding audio without the delay. In order to prevent interference, when the user 130 speaks, the same techniques can be used to isolate the user's voice over the noises of the television 110.

In some embodiments, only certain frequencies are recorded for the audio segment so as to not accidentally record the user's voice. For example, only frequencies above 19,000 Hz or above 20,000 Hz can be recorded. Alternatively, banding can be used to only record portions of various frequencies (e.g., to detect a fingerprint in the audio segment). For example, between 100-300 Hz and 1,000 and 2,000 can be recorded while the other frequencies can be filtered.

Figure 4:
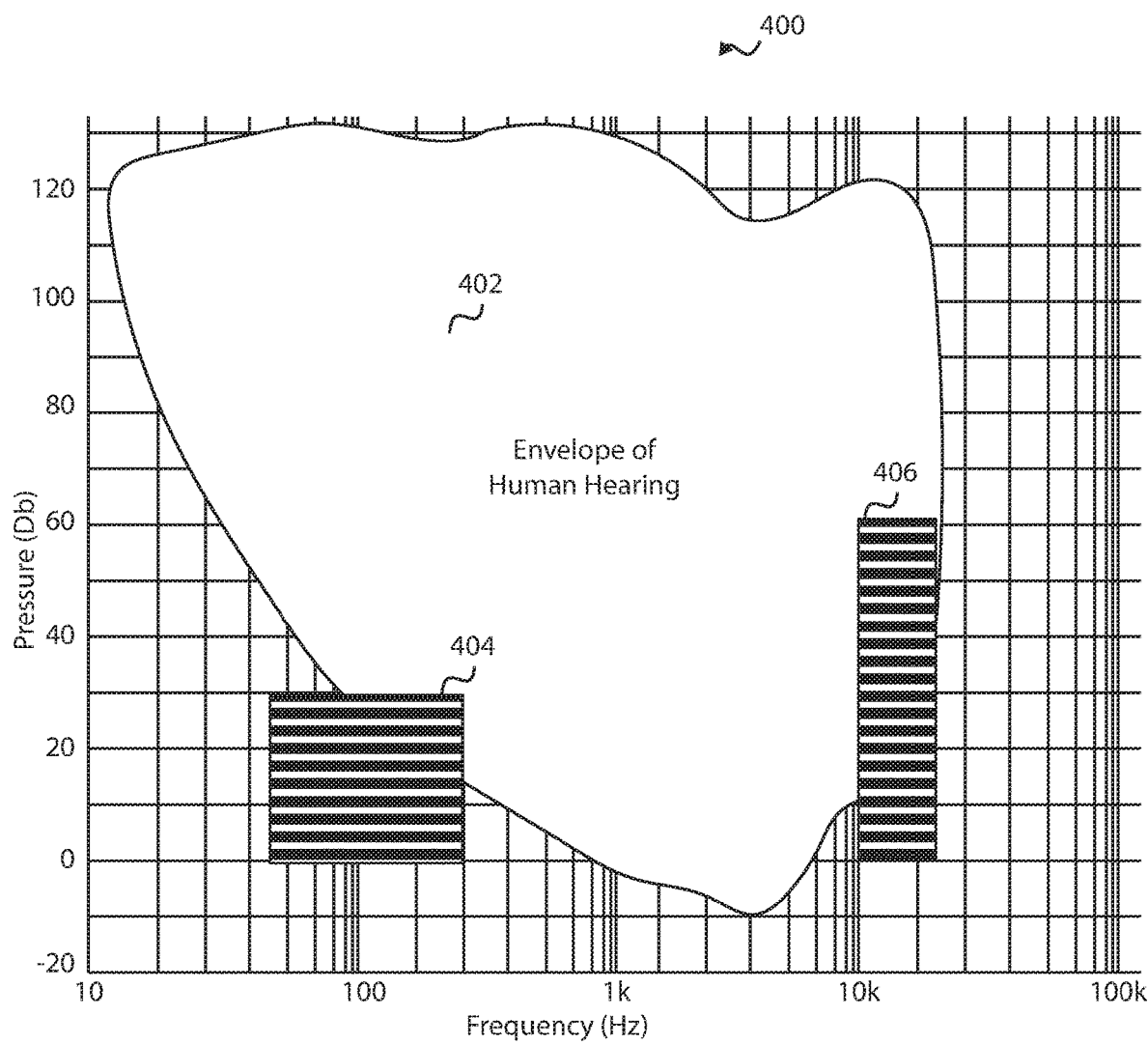
FIG. 4 shows an example graph of where identifiers can be encoded into an audio segment.

FIG. 4 shows an example graph 400 of where identifiers can be encoded into an audio segment. For example, region 402 shows the envelope of human hearing. This region represents the general limit to what a young person can hear. Below the region is too quiet to hear (i.e., the pressure is too low) whereas above the region represents where pain is felt. To the right (e.g., above around 20 kHz) is ultrasonic whereas on the left is infrasonic. The identifier can be coded in the ultrasonic range such as in region 406. This range can be above 10 kHz, 12.5 kHz, 15 kHz, 20 kHz, etc. and anywhere in between. Because many audio systems have a sampling limit of 41 kHz, the maximum frequency can be 20.5 kHz. The identifier can additionally or alternatively be encoded in the infrasonic range. For example, region 404 shows where the pressure is too low for the frequency and people cannot hear those sounds. The frequencies and pressure used for encoding the identifier can conform to the outside of the envelope of human hearing so that they do not detract from the listening experience.

Figure 5:
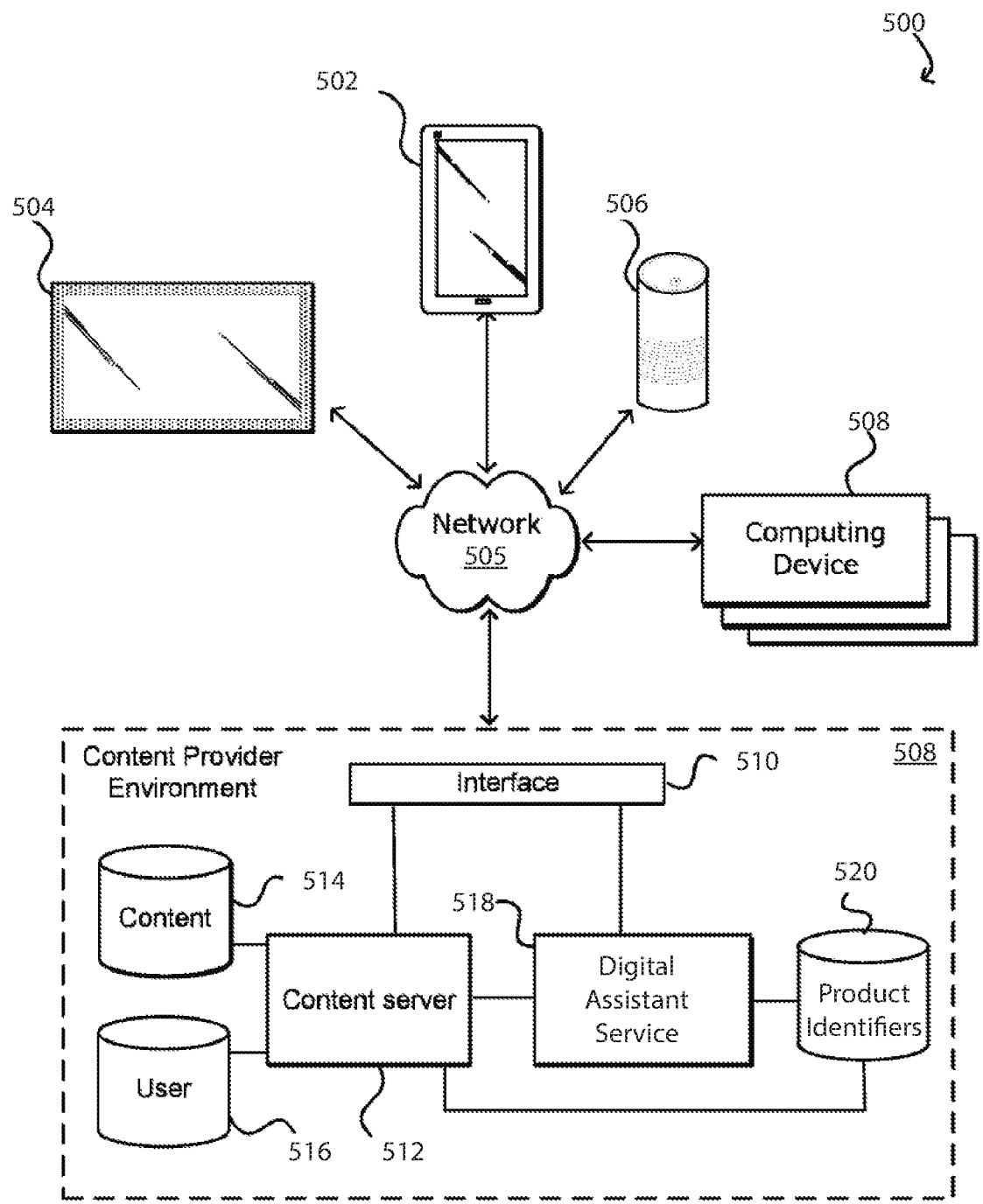
FIG. 5 illustrates an example of an environment that can be used to implement aspects in accordance with various embodiments.

FIG. 5 illustrates an example of an environment 500 that can be used to implement aspects in accordance with various embodiments. As described, various embodiments enable content to be presented on secondary computing devices remote a primary computing device. The secondary computing devices may be remote from and not tangibly connected with the primary computing device. In some embodiments, the primary and secondary computing devices may be tangible connected. In FIG. 5, client computing device 502 can represent the primary computing device and the secondary computing devices can include display device 504, active listening device 506 (e.g., a smart speaker or digital assistant), and computing devices 508 that can represent anyone of a number of devices. The primary computing device can communicate directly with one or more of the secondary computing devices. For example, devices can communicate one another using any communication protocol known in the art such as, but not limited to, BLUETOOTH®, Wi-Fi and radio frequency. Additional or alternatively, the devices can communicate through a resource provider environment 508 across at least one network 505. The devices can also communicate with the resource provider environment for various other purposes as described herein.

In this example, a call received to the resource provider environment 508 for additional or supplemental content can be received by an interface layer 510 of the environment. As known for network environments, the interface layer can include components such as interfaces (e.g., APIs), load balancers, request and/or data routers, and the like. In this example a request can include a request for an item identifier or a request to respond to a command/query. The request can be directed to one or more content servers 512, which can obtain the content (e.g., primary content and/or secondary content) from a content data store 514 or other such repository to be sent back across the network(s) to an appropriate one of the devices (502, 504, 506, 508). In some embodiments, information for the request might also be compared against user data in a user data store 516 or other such location do determine, for example, whether the user has access rights to that content.

In some cases, a request received to the content provider environment 508 might be from another entity, such as one of the secondary computing devices As discussed elsewhere herein, additional or secondary computing devices can present secondary content to users as part of, or along with, the primary content. The interface layer can determine the type of request and cause information to be forwarded to content server 512 or digital assistant service 518 to perform digital assistant tasks or other such system or service. In various embodiments, the digital assistant service 518 can interpret speech, decode product identifiers, and generate responses. Product identifiers can be stored in product identifier database 520. Information for such purposes may be included in the request and/or obtained from user data store 516. In various embodiments, the devices can receive input to control the presentation of content. The input can be a touch-based input, a gesture-based input (e.g., waving at the primary computing device), an audio-based input (e.g., utterance received by the primary computing device), a motion-based input (e.g., movement of the primary computing device), an image-based input, among other such inputs. The input can trigger a request for content, and the content server and/or the image analysis service can determine the appropriate content to be provided. Accordingly, a user can view and interact with presented content, and can maneuver through various content items using various approaches discussed and suggested herein.

The identifier can include information about the content. For example, for a video broadcast, the identifier can include identifiers for the television, an application presenting the content, a set-top box, a broadcaster, an internet service provider, a content creator, etc. In some embodiments, the identifier can include other metadata such as the identifier creation timestamp, an authentication identifier that can be used to authenticate the identifier, etc.

Figure 6:
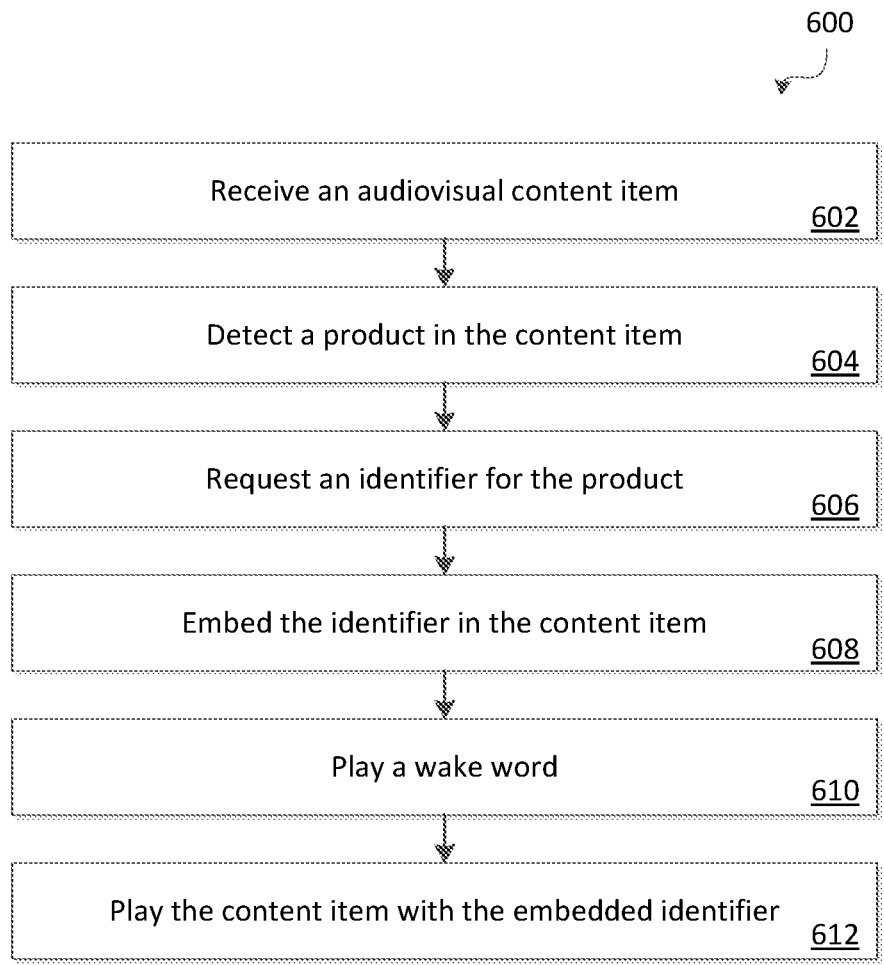
FIG. 6 illustrates an example method for preparing a content item for transmitting contextual information to neighboring devices.

FIG. 6 illustrates an example method 600 for preparing a content item for transmitting contextual information to neighboring devices. In some embodiments, content creators, content distributors, advertisers, content players, smart speakers, digital assistants, and analytics services are provided by two or more companies and do not directly share data amongst each other. This can make it difficult for one entity to provide a relevant experience to what another entity is doing. For example, a smart speaker and/or digital assistant might not be able to provide contextually relevant responses without knowing what is playing on a nearby television. Certain embodiments disclosed herein enable a content creator, content distributor, advertiser, and/or content player to embed an identifier within the content item that is easier for another entity to gain contextual awareness of the contents of the content item. This enables the smart speaker to understand the context being presented without interfering with the privacy of the user.

A system can receive an audiovisual content item 602. A content item can be prerecorded and delivered on demand or can be broadcast live. While the content item is sometimes described as being audiovisual, the content item can be any type of media such as a movie, television show, sporting event, livestream, music, radio, etc. The content item can be a video conference, web chat, website, videogame, etc. The content item can include an audio component and/or a video component. The content item can be received as part of a live workflow, on a database, etc. The content item can be digital and/or analog.

The system can detect a product in the content item 604. In some embodiments, the system that receives content item does not have any previous indication that there is a product in the content item. Although the term "product" is used here, the principles disclosed herein are applicable to any identifiable item such as an application, file, media item, etc. The system can automatically detect the product using image analysis techniques such as image segmentation and/or neural network classifiers. The system can have a database of approved (e.g., validated or known) products and can use that database to identify the product. In some embodiments, the system can only search for products that are featured in the content item. A product can be "featured" based on its prominence in the content item. For example, if a product is central in an image frame, if it is salient (e.g., not blurry and with moderate color contrast), if it is large, if characters appear to be focused on the product, if characters reference the product, etc. then the product can be "featured."

In some embodiments, an entity can manually identify the product. For example, an operator can determine that a product is in the content item and label it appropriately. In some embodiments, an advertiser can make an advertisement (e.g., a 30 second ad) and identify the product within the advertisement.

It should be understood that the item identified within the content item can be a physical item or a non-physical item. For example, the item can be a person, location, product, song, movie, date, concept (e.g., "the second world war" or "metamorphosis) etc. In some embodiments, the item is directly featured (e.g., a bicycle is shown on screen) or indirectly referenced (e.g., the characters talk about a bicycle that is off-screen).

The system can request an identifier for the product 606. For example, a content creator, distributor, advertiser, etc. can request an identifier associated with the product. The identifier can be a uniform resource locator (URL), universal product code (UPC), an identifier on a marketplace, etc. In some embodiments, the identifier is specific to the requestor. That is, the product can have multiple identifiers corresponding to respective requestors. In some embodiments, each request (even from a same requestor) can have multiple identifiers). In this way, an item repository can distinguish between requests. This can be useful if the request specifies an active period (e.g., if the requestor must pay for the identifier to be active for a period of time). The request can specify an amount of time that the identifier can be active. The request can include a transaction fee to register the identifier.

The system can embed the identifier in the content item 608. In some embodiments, the identifier is embedded via an audio signal. This audio signal can be inaudible to most humans, such as a sound in the infrasonic and/or ultrasonic range. The audio signal can be within the envelope permitted by the audio capabilities of the audio component of the signal (e.g., the bitrate) and/or a playback device. The audio signal can be outside the envelope of hearing for most humans. In some embodiments, the audio signal can be a "fingerprint" or "watermark" within the envelope of human hearing but is indiscernible to a listener. For example, a low-volume background noise can contain an audio watermark that can be extracted by a machine but is imperceptible to a listener. Such a watermark can be achieved through varying the pitch, volume, and other characteristics of a noise pattern. In some embodiments, the identifier is embedded through use of multiple audio channels. For example, a sound such as a noise pattern can be offset between two different channels (e.g., by a few milliseconds or a portion of a phase, etc.) and the offset variance can be decoded to retrieve the identifier.

In some embodiments, the identifier can be embedded into the content item through visual means. For example, the embedding can include a subtle visual flicker that is at a frequency or intensity that is not disruptive to viewing. The visual identifier can use shifts in the gamma of part of the image to encode the identifier. The visual identifier can be outside of human perception, for example the visual identifier can be in the infrared spectrum.

The identifier can be embedded into the content item through non-visual radio means. For example, the identifier can be communicated through Bluetooth, WiFi (e.g., 802.11), and other wireless protocols. The identifier can be embedded into the metadata of the content item. For example, metadata can include a timecode of the content item and the associated identifier.

Multiple embedding techniques can be combined. For example, a first system can embed the item identifier as metadata into the content item and a second system can read the metadata and embed the identifier into the audio and/or video stream for the content item when playing the content item.

The system can play a wake word 610. In some embodiments, the system can use any audio, visual, and/or radio trigger to wake a system. This can have the effect of instructing a smart speaker, virtual assistant, etc. that an identifier is forthcoming. This signal can be an inaudible signal such an ultrasonic or infrasonic sound, infrared light signal, etc. In some embodiments, the signal is embedded in the content item using the techniques described above.

The system can play the content item with the embedded identifier 612. It should be understood that the device that plays the content item is not always required to be specially configured to play embedded identifiers or wake words. In other words, the device can be a standard television, radio, etc. that merely plays the audiovisual stream provided to it and the provided audiovisual stream can include the embedded identifier and wake word.

Figure 7:
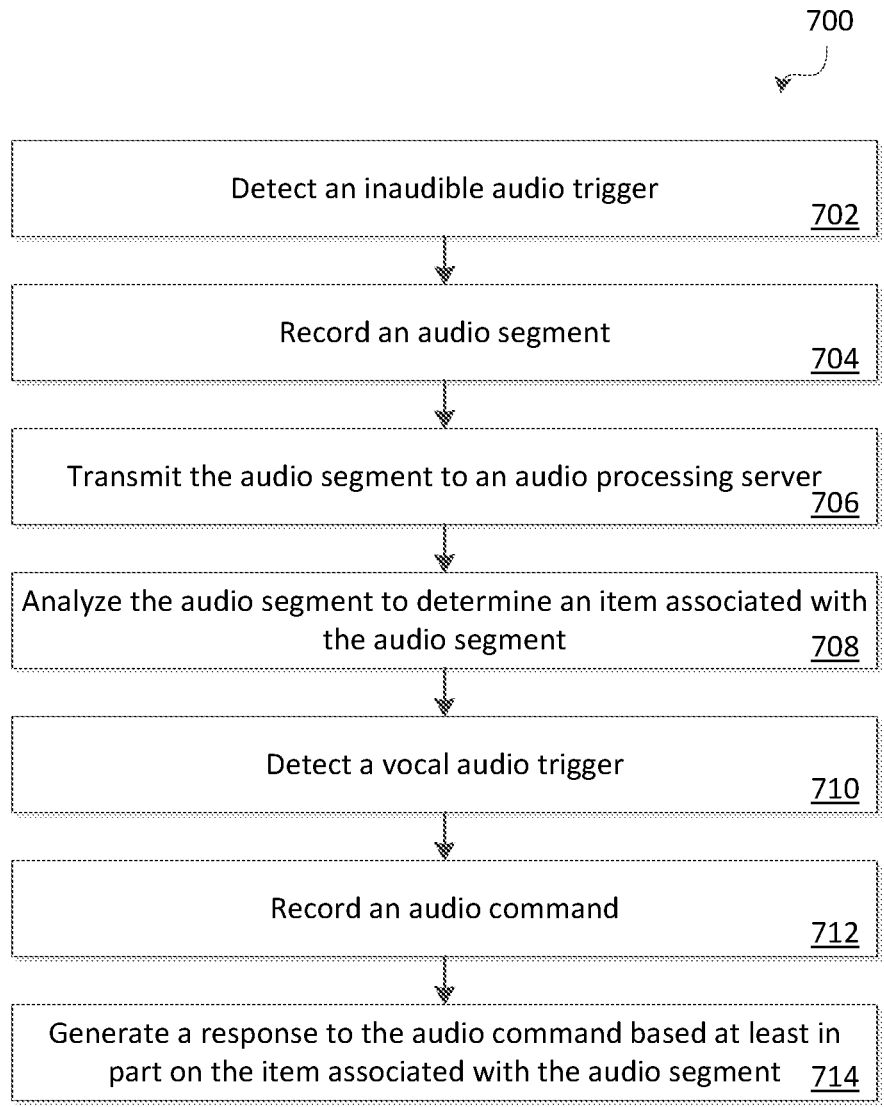
FIG. 7 illustrates an example method for providing a contextually relevant experience.

FIG. 7 illustrates an example method 700 for providing a contextually relevant experience. For example, a system can perform a method such as example method 600 indicating the current context of a content item. Some or all of the steps of example method 700 can be performed by a "smart device" such as a smart speaker, smart display, smart phone, etc. A device can be associated with a virtual assistant. A virtual assistant can be a collection of services that can provide responses designed to be most relevant to a user. For example a virtual assistant can interpret natural language commands or queries and provide natural language responses. It should be understood certain references herein to a virtual assistant can refer to capabilities of a smart device, a service enabling such functionality, or a combination thereof.

A system can detect an audio trigger 702. For example, a smart device can be in "inactive" mode while waiting for the audio trigger. Being in an inactive mode can mean that the device is in a low-power mode such as a low power state for the processor. Inactive mode can mean that the device is not recording and/or analyzing audio from a microphone except to detect an audio trigger (e.g., a wake word). The system can have special circuitry designed to detect the audio trigger. As described herein, the audio trigger can be an inaudible audio code such as ultrasound or infrasound. Alternative or additional to an audio trigger, the system can detect a visual trigger and/or a radio trigger.

The system can record an audio segment 704. After detect the audio trigger, the system can begin recording the subsequent audio segment. In some embodiments, the system can only record a specific portion of the audio segment. For example, to preserve privacy, the system can record audio in such a way to disregard spoken words of nearby people. This can be done by recording only the higher or lower frequency elements, by applying a band-stop filter to reject frequencies common to speech, and/or applying noise to the recording to disguise the spoken word.

It should be understood that the system need not store the audio segment into long-term memory of an edge device. For example, the system can detect and analyze the audio segment without storing it. Thus, "record" can mean detect, analyze, transmit, etc. as appropriate. In other words, the capturing of audio signals and the analysis thereof can be accomplished in real time without delay.

In some embodiments, the system can use directional audio recording techniques to isolate the source of the audio segment based on the source of the inaudible audio trigger. For example, the system can use an array of microphones to detect audio from only a certain region of a room. This can be done through physical means (e.g., each microphone is focused at a certain region) or through digital means (e.g., comparing audio signals and, based on the wave characteristics, isolating an audio stream). Using one or more microphones, a microphone system can be tuned to isolate audio from a certain location. For example, the system can detect a delay in audio, phase changes, reflections, amplitude changes, etc. to isolate an audio stream from a desired spatial location.

The system can transmit the audio segment to an audio processing server 706. In some embodiments, the system holds the audio segment at the edge device (e.g., the smart device herein described) until the device detects a spoken command or query. The edge device can then send the audio segment along with the spoken command or query.

The system can analyze the audio segment to determine an item associated with the audio segment 708. For example, the system can detect a code contained within the audio segment identifying an item, a product, etc. on an item repository or marketplace. The system can detect an audio fingerprint in the audio segment. In some embodiments, the system can also detect an identifier for a content creator, broadcaster, distributor, content player, etc. in the audio segment. In some embodiments the system can reference an identifier database and use the detected identifier as a key that maps to relevant information. Such relevant information can include a reference to an item, product, manufacturer, content creator, content distributor, content player, etc.

The system can detect a vocal audio trigger 710. For example, the audio trigger can be a wake word spoken by a person intending to bring the system into an active mode. Active mode can mean that the device is actively recording audio. Active mode can mean a full-power mode. In some embodiments, the system can have circuitry designed to be triggered by two types of wake words, a spoken (vocal) wake word and an inaudible wake word. When it detects the inaudible wake word it can then only listen to frequencies that are different than vocal tones whereas when it detects the spoken wake word it can listen to a wider range of frequencies. In order words, the system can have two types of active listening modes, a first designed to ignore spoken words (e.g., by not recording them, by obscuring them after recording them, or by otherwise not analyzing them) and the second to detect spoken words.

The system can record an audio command 712. For example, the system can record a request, query, or spoken instruction. For example, the audio command can be a request to have more information for an item. The audio command can be a request to purchase an item of a certain type. The audio command is a type of interaction request. In some embodiments other interaction requests are contemplated. Example interaction requests can include pressing a button on a device, selecting an option on a device, speaking a word or phrase, doing a gesture, etc. Any action intended to provoke a response from the device can be considered an interaction request.

The system can generate a response to the audio command based at least in part on the item associated with the audio segment 714. For example, the system can determine a collection of possible responses and weight them according to relevance to the item associated with the audio segment. In some embodiments, the system can generate a generic response and "fill in the blanks" according to the item associated with the audio segment. For example, if the query is "How much does a [item type] cost?" then the response can be "Are you interested in [item]? If so, it costs [item cost]." The response can provide an option to purchase the item.

In some embodiments, the response includes at least one of an option to purchase the item, information related to one or more reviews, a summary rating of the item, a total time required to ship the item, or item details. Item details can include physical characteristics of an item such as the item's weight, dimensions, part count, material type, color, etc. In some embodiments, the response can indicate a recommend age for the item.

In some embodiments, the system can determine relevant items from past audio segments. For example, if 5 audio segments were previously detected associated with 5 various items, the system can determine which of those 5 items are currently relevant. Relevance can be determined based on how recent the audio segment was detected. For example, newer audio segments can be deemed more relevant than older audio segments.

It should be understood that the principles herein disclosed for a contextually relevant experience need not be limited to a vocal interface. For example, after the system detects the item identifier, when a user opens an interface for the system, the system can provide a contextually relevant experience to the user. For example, the user could open an interface on the user's phone and be presented (automatically) with details for an item presented on a television. The user would not necessarily need to provide any information to the device; the device would automatically detect the appropriate context.

Figure 8:
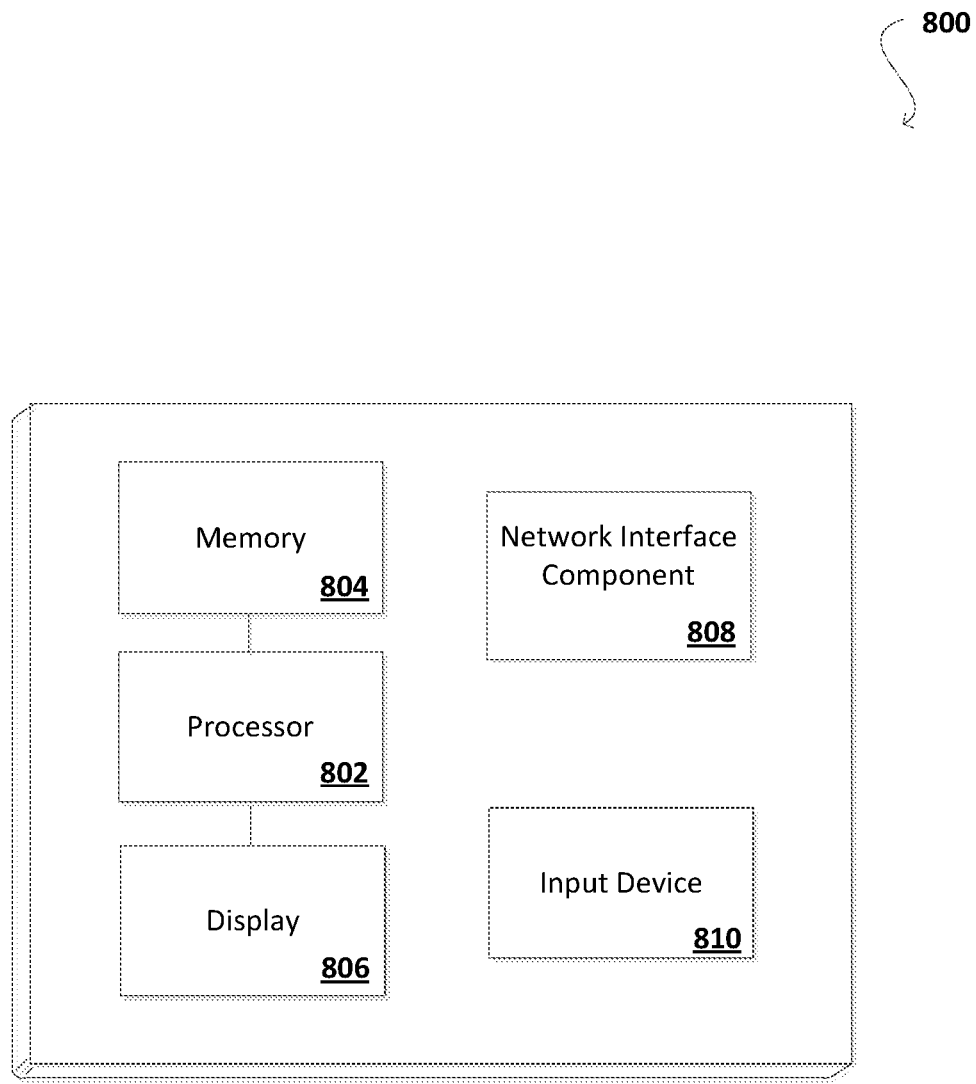
FIG. 8 illustrates example components of a computing device that can be utilized in accordance with various embodiments.

FIG. 8 illustrates a logical arrangement of a set of general components of an example computing device 800 that can be used to implement aspects of the various embodiments. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 810 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 800 of FIG. 8 can include one or more network interface components 808 for communicating over various networks, such as a Wi-Fi, Bluetooth, RF, wired, or wireless communication systems. The device in many embodiments can communicate with a network, such as the Internet, and may be able to communicate with other such devices.

Figure 9:
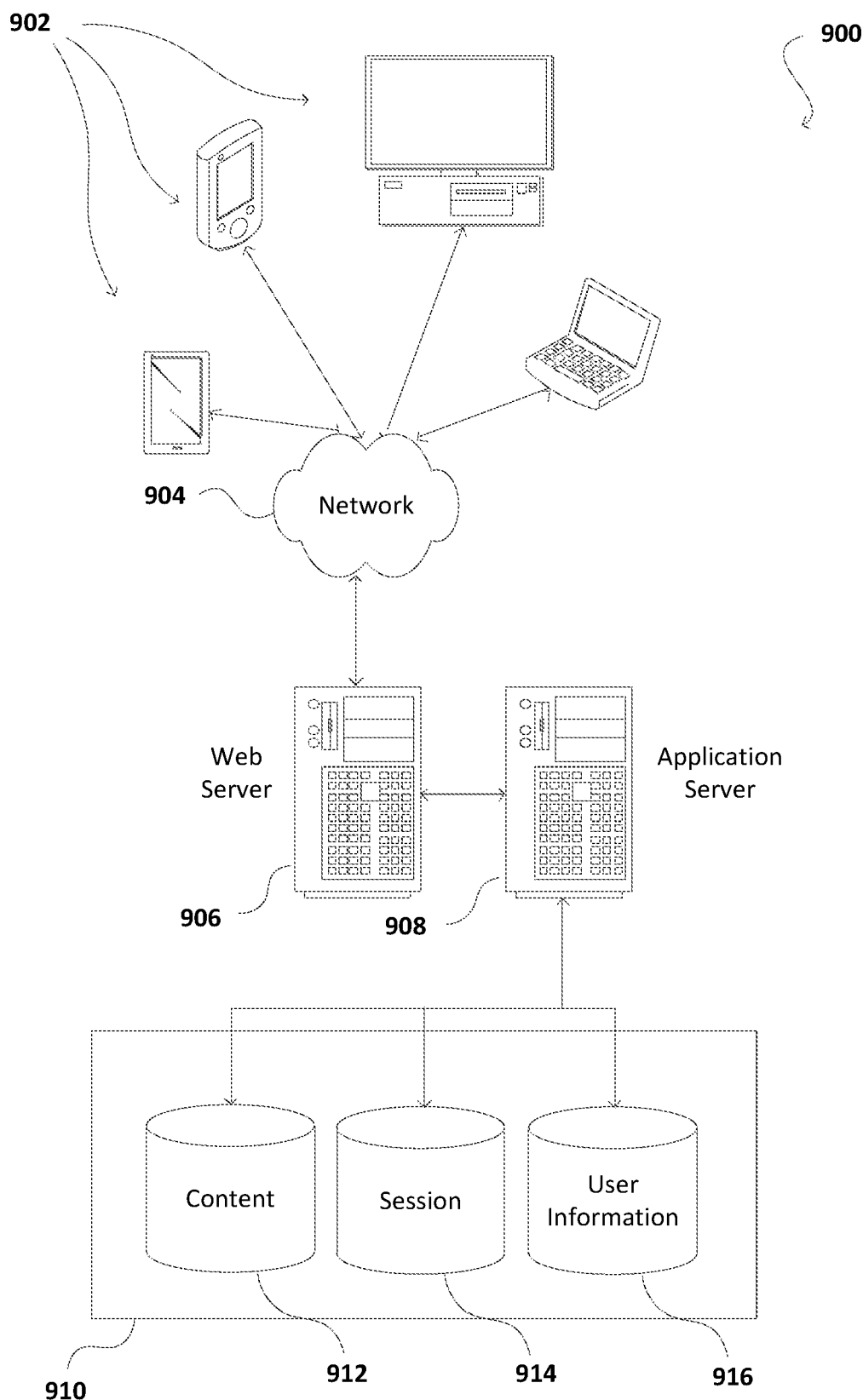
FIG. 9 illustrates an example environment in which aspects of the various embodiments can be implemented.

As discussed, different approaches can be implemented in various environments in accordance with the described embodiments. For example, FIG. 9 illustrates an example of an environment 900 for implementing aspects in accordance with various embodiments, such as to obtain content to be rendered by a 3D or VR headset, or other such device or display. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. This can include, for example, image information captured for the face of a user or a request for virtual reality content to be rendered on a virtual reality headset or other such device. Examples of client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for using imperceptible context identifiers comprising:
    receiving a first signal, at a service associated with a smart speaker, indicative of an inaudible audio trigger being presented in response to detection of a representation of an item in media content presented by a media presentation device;
    receiving a second signal, from the smart speaker, indicative of an audible audio segment presented by the media presentation device;
    determining that the audible audio segment corresponds to the item;
    receiving a third signal, from the smart speaker, indicative of an interaction request, wherein the smart speaker withholds transmission of the second signal until after receipt of the interaction request, the interaction request provided by a user;
    determining a response to the interaction request, based at least upon the item represented in the media content, the response to the interaction request being contextually based responsive to a format of the interaction request; and
    transmitting instructions, to the smart speaker, to play the response.

2. The computer-implemented method of claim 1, wherein the audible audio segment has an ultrasonic component, the method further comprising:
    receiving the ultrasonic component; and
    detecting an identifier for the item in the ultrasonic component.

3. The computer-implemented method of claim 1, further comprising:
    generating the media content by adding the ultrasonic component to an intermediate media content; and
    transmitting, to the media presentation device, the audiovisual content.

4. A computer-implemented method comprising:
    receiving, at an audio processing server from a media device, a detected audio trigger from a source device;
    receiving, at the audio processing server, from the media device, and after receipt of the detected audio trigger, an audible audio segment from the source device;
    receiving, after the audible audio segment and at the audio processing server from the media device, an interaction request uttered by a user, wherein the audible audio segment is withheld from transmission until after the media device receives the interaction request;
    transmitting, based at least in part on a context of the interaction request, to the media device from the audio processing server, information for an item determined to be associated with the audible audio segment; and
    generating a response to the interaction request based at least upon the item associated with the audible audio segment and the context of the interaction request.

5. The computer-implemented method of claim 4, further comprising:
    transmitting content for presentation with an audio component;
    determining a time that the item is featured in the content;
    presenting the audio trigger with the audio component at the time that the item is featured; and
    presenting the audible audio segment with the audio component after the audio trigger.

6. The computer-implemented method of claim 5, further comprising:
    searching a database of items using a video frame of the content; and
    determining that the item associated with the audible audio segment is located within the video frame of the content.

7. The computer-implemented method of claim 4, further comprising:
    transmitting an instruction to place the media device in a passive mode; and
    transmitting an instruction to place the media device in an active listening mode, after detecting the audio trigger.

8. The computer-implemented method of claim 4, further comprising:
    determining that the interaction request is a request pertaining to a type of item; and
    determining that the item is of the type of item.

9. The computer-implemented method of claim 4, further comprising:
    determining a location for the first source based on the detected audio trigger; and
    tuning a microphone system to isolate an audio stream from the detected location, wherein the audio stream comprises the audible audio segment.

10. The computer-implemented method of claim 4, further comprising:
    determining a time that the detected audio trigger was detected;
    determining a time that the interaction request was detected; and
    determining that the difference between the time that the detected audio trigger was detected and the time that the interaction request was detected is less than a threshold amount.

11. The computer-implemented method of claim 10, further comprising:

receiving a request to associate the item with the audible audio segment, the request including the threshold amount.

12. The computer-implemented method of claim 4, further comprising:
    determining a time in a video associated with the audible audio segment; and
    determining that the item is featured at the time in the video.

13. The computer-implemented method of claim 4, wherein the response includes at least one of an option to purchase the item, information related to one or more reviews, a summary rating of the item, a total time required to ship the item, or item details.

14. A system, comprising:
    at least one processor; and
    memory including instructions that, when executed by the at least one processor, cause the system to:
        receive, at an audio processing server, a detected audio trigger from a source device;
        receive, at the audio processing server and after receipt of the detected audio trigger, an audible audio segment from the source device;
        detect, at a second source device, an imperceptible audio trigger from the source device;
        detect, at the second source device, an audio segment following the audio trigger;
        receive, at the second source device, an interaction request from a user;
        receive, at the audio processing server, the interaction request from the second source device;
        transmit, from the second source device and after the interaction request, the audio segment to the audio processing server;
        receive, from the audio processing server, information for an item determined to be associated with the audio segment;
        transmit, based at least in part on a context of the interaction request, to the second source device from the audio processing server, information for an item determined to be associated with the audible audio segment; and
        generate a response to the interaction request based at least upon the item associated with the audible audio segment and the context of the interaction request.

15. The system of claim 14, wherein the instructions when executed further cause the system to:
    transmit instructions to present content with an audio component;
    determine a time that the item is featured in the content;
    transmit instructions to present the audio trigger with the audio component at the time that the item is featured; and
    transmit instructions to present the audible audio segment with the audio component after the audio trigger.

16. The system of claim 15, wherein the instructions when executed further cause the system to:
    search a database of items using a video frame of the content; and
    determine that an item of the database of items is located within the video frame of the content.

17. The system of claim 14, wherein the instructions when executed further cause the system to:
    transmit an instruction to put a media device in a passive mode; and
    transmit an instruction to put the media device in an active listening mode after the media device detects the audio trigger.

18. The system of claim 14, wherein the instructions when executed further cause the system to:
    determine that the interaction request is a request pertaining to a type of item; and
    determine that the item is of the type of item.

19. The system of claim 14, wherein the instructions when executed further cause the system to:
    determine a time that the audio trigger was detected;
    determine a time that the interaction request was detected; and
    determine that the difference between the time that the audio trigger was detected and the time that the interaction request was detected is less than a threshold amount.

20. The system of claim 14, wherein the instructions when executed further cause the system to:
    determine a time in a video associated with the audible audio segment; and
    determine that the item is featured at the time in the video.

* * * * *